(12) United States Patent
Furlong et al.

(10) Patent No.: US 8,733,188 B2
(45) Date of Patent: May 27, 2014

(54) APPARATUS FOR MOUNTING PIPE SENSORS

(75) Inventors: Edward Randall Furlong, Beverly, MA (US); Colin James Mackenzie, Leicester (GB)

(73) Assignee: General Electric Company, Schenectady, NY (US)

( * ) Notice: Subject to any disclaimer, the term of this patent is extended or adjusted under 35 U.S.C. 154(b) by 741 days.

(21) Appl. No.: 12/870,028

(22) Filed: Aug. 27, 2010

(65) Prior Publication Data

US 2012/0048038 A1   Mar. 1, 2012

(51) Int. Cl.
    *G01D 21/00*   (2006.01)

(52) U.S. Cl.
    USPC ........................................ 73/866.5

(58) Field of Classification Search
    USPC ........................................ 73/866.5
    See application file for complete search history.

(56) References Cited

U.S. PATENT DOCUMENTS

| 3,899,782 | A | * | 8/1975 | Miller et al. | .......... | 374/110 |
| 3,980,542 | A | * | 9/1976 | Winslow et al. | .......... | 73/86 |
| 4,165,654 | A | * | 8/1979 | Hammitt et al. | .......... | 73/723 |
| 5,268,989 | A |   | 12/1993 | Moslehi et al. | | |
| 8,305,101 | B2 | * | 11/2012 | Desta et al. | .......... | 324/755.01 |
| 2009/0173165 | A1 |   | 7/2009 | Benestad et al. | | |

FOREIGN PATENT DOCUMENTS

| CN | 1112677 A | 11/1995 |
| DE | 8617027 U1 | 5/1989 |
| EP | 0254597 A2 | 1/1988 |
| EP | 1415698 A1 | 5/2004 |
| EP | 1980830 A2 | 10/2008 |
| EP | 2063068 A1 | 5/2009 |
| WO | WO-2008075858 A1 | 6/2008 |
| WO | WO-2009056840 A2 | 5/2009 |
| WO | WO-2009068907 A1 | 6/2009 |
| WO | WO-2009087371 A1 | 7/2009 |
| WO | WO-2009109745 A1 | 9/2009 |

OTHER PUBLICATIONS

Search Report from EP Application No. 11178552.3 dated Feb. 12, 2014.

* cited by examiner

*Primary Examiner* — R. A. Smith
*Assistant Examiner* — Alex Devito
(74) *Attorney, Agent, or Firm* — Global Patent Operation; Mark A. Conklin

(57) ABSTRACT

An apparatus for mounting a pipe sensor is disclosed. The apparatus comprises a pipe and a sensor. The pipe has a pipe wall with a section removed defining a passage through the pipe wall. The sensor has a collar, is disposed in the passage, and is exposed to the interior of the pipe. In one embodiment, the sensor can be welded to the pipe wall. In another embodiment, an insert can be disposed in the passage between the sensor and the pipe wall, with a locking nut engaged with the insert and pressing upon the collar to fasten the sensor to the insert.

17 Claims, 2 Drawing Sheets

US 8,733,188 B2

APPARATUS FOR MOUNTING PIPE SENSORS

BACKGROUND OF THE INVENTION

The subject matter disclosed herein relates to pipe sensors, and particularly to pipe-mounted sensors for detecting characteristics internal to the pipe.

Sensors can be used in determining characteristics inside pipes and piping systems, such as pressure, flow volume, flow rate, temperature, moisture and humidity, and fluid concentration, amongst others. The sensors can be integral in providing measurement and control of fluids in the pipes, and in maintaining efficient and accurate operations. Efficient control and operation in commercial industries can be essential in maintaining human safety, environmental safety, and cost efficiency.

In industries such as the oil industry, the sensors are mounted to the pipes using industry standard pipe connections, which are often large flanges on the end of a length of pipe. These flanges are bolted or screwed together at a union or joint. A sensor is attached to the flange, and the flange is connected to another flange at the end of a jointed pipe, so that the sensor is exposed to the internal area of the pipe. Because the pipe connections used for connecting sensors are also used for connecting other standard pipe equipment (e.g. pipes), the pipe connections (e.g. flanges) are very large relative to the sensors. These pipe connections can be particularly large, or otherwise onerous, in some industries, such as the subsea oil industry or other industries with relatively harsh operating environments that necessitate numerous or strict regulations, and/or stronger or more durable pipe connections.

Because the pipes and other pipe equipment can be very large relative to the sensors, a relatively large amount of space is occupied to connect the small sensors to the pipes. Space to fit sensors attached by large flanges can become very crowded, or be too small, limiting the number of sensors that can be used in a given area, and limiting the control and operation of the pipe system. Adding sensors or relocating sensors after the initial design of a pipe system can be very difficult and expensive. Furthermore, larger pipe connections require a larger amount of material, which is costly.

It would be advantageous to attach sensors within pipes without the limitations of using bulky pipe connections.

BRIEF DESCRIPTION OF THE INVENTION

An apparatus for mounting sensors within pipes is provided that avoids using bulky pipe connections.

In one embodiment, an apparatus for mounting a pipe sensor comprises a pipe, an insert, a sensor, and a locking nut. The pipe has a pipe wall. The pipe wall has a section removed that defines a passage through the pipe wall. The insert is disposed in the passage and is fastened and sealed to the pipe wall. An inner surface of the insert defines a cavity in the insert. The inner surface has a tapered portion. The sensor has a collar, is disposed in the cavity of the insert, is fastened and sealed to the insert, and is exposed to the interior of the pipe. A locking nut is engaged with the insert and pressed upon the collar to fasten and seal the sensor to the insert.

In another embodiment, an apparatus for mounting a pipe sensor comprises a pipe and a sensor. The pipe has a pipe wall with a section removed that defines a passage through the pipe wall. The sensor is disposed in the passage and exposed to the interior of the pipe. The sensor has a collar which is welded to the pipe wall to form a fluid-impermeable seal between the collar and the pipe wall.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. Thus, for further understanding of the invention, reference can be made to the following detailed description, read in connection with the drawings in which.

DETAILED DESCRIPTION OF THE INVENTION

Figure 1:
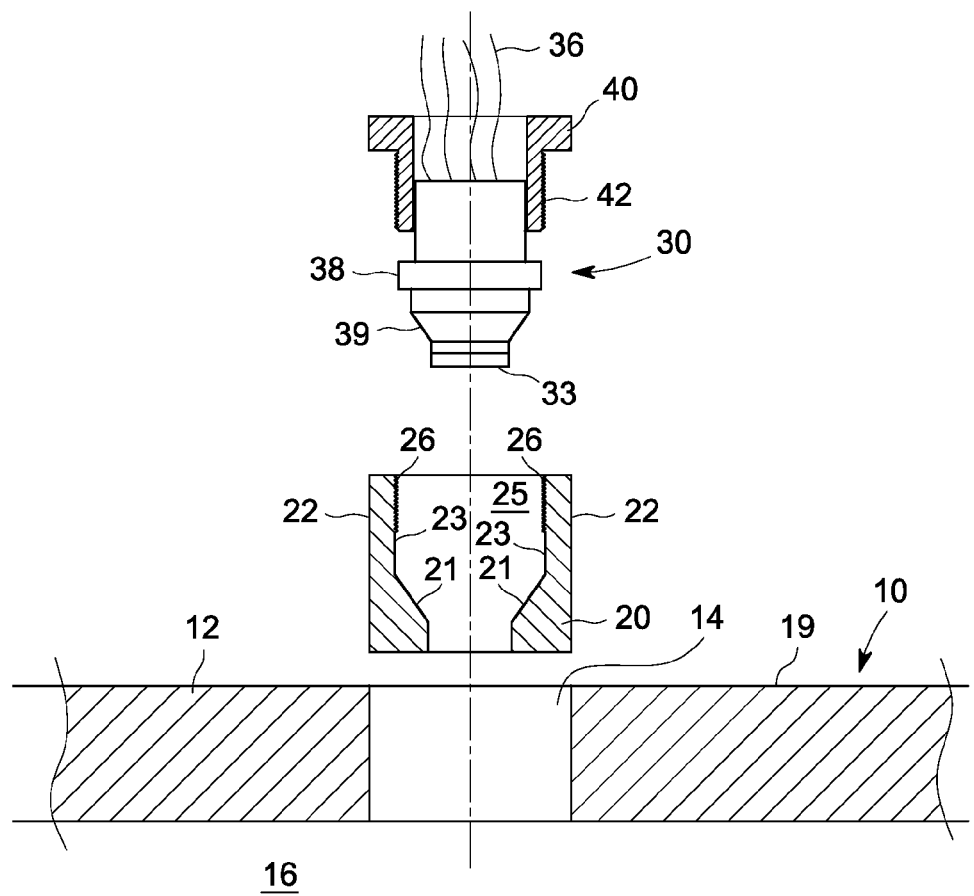
FIG. 1 is an exploded side view of a sectioned pipe wall of a pipe, with a sensor that can be embedded in the pipe wall in an exemplary embodiment of the invention using an insert and a locking nut.

FIG. 1 is an exploded side view of a sectioned pipe wall 12 of a pipe 10, with a sensor 30 that can be embedded in the pipe wall 12 in an exemplary embodiment of the invention using an insert 20 and a locking nut 40. The sensor 30 can be one from a variety of sensors. Some such devices include pressure sensors, flow rate meters, flow volume meters, temperature meters, moisture and humidity meters, sand or mud detectors, and fluid concentration meters. An example of a sensor that can be mounted according to this method includes a piezoresistive pressure sensor with a piezoresistive transducer. Another example of a sensor includes a resonating device, such as a trench etched resonant pressure sensor ("TERPS"). The sensors can be shaped variously. In one embodiment, the diameter or width of a sensor tip 33 is approximately 0.5 inches (12.7 mm). The sensor tip 33 can be exposed to the interior 16 of the pipe 10. The sensor 30 can have a collar 38, or a collar 38 can be fastened to the sensor 30, such as by welding the collar 38 to and/or around the sensor 30. The sensor 30 can have a tapered surface 39 between the collar 38 and the sensor tip 33. The sensor 30 can have or can be attached to electrical wires 36 to communicate electrical signals from the sensor 30.

The pipe wall 12 can be made of a material suitable for the particular application. In the subsea oil industry, for example, steel, a superalloy, or another high-performance alloy, such as an austenitic nickel-chromium-based superalloy can be used. Other materials suitable for the application and industry can also be used. The pipe wall 12 can be of varying thicknesses. In one example of a subsea oil drilling application, the pipe wall 12 can be between 0.25 inches (6.35 mm) and 0.375 inches (9.525 mm) thick. A section of the pipe wall 12 can be removed, such as by boring a hole through the pipe wall 12, to create a passage 14 through the pipe wall 12 from an outer surface 19 of the pipe wall 12 to an inner surface 18 of the pipe wall 12.

The insert 20 can be sized and shaped on the outside to fit into the pipe wall 12 in the passage 14. For instance, if the passage 14 is cylindrical, then outer surface 22 of the insert 20 can be shaped cylindrically as well, and dimensioned so the insert 20 can fit snugly in the passage 14. Alternatively, the passage 14 of the pipe wall 12 can be shaped and sized to receive the insert 20.

The insert 20 can be shaped and sized to accommodate receiving the sensor 30. The insert 20 can have a cavity 25 into which the sensor 30 can be inserted. The cavity 25 can be defined by an inner surface 23 of the insert 20. The inner surface 23 can comprise an internally threaded portion 26, and a tapered portion 21. The threaded portion 26 can be positioned along the inner surface 23 at the end of the insert 40 radially outward from the center axis of the pipe 10, and the tapered portion 21 can be positioned along the inner surface 23 at the end of the insert 40 radially inward toward the center axis of the pipe 10 from the threaded portion 26. The length of the insert 40 in the radial direction of the pipe 10 can be longer than the thickness of the pipe wall 12 to ensure enough space for the threaded portion 26 and the tapered portion 21, and to provide extra support in securing the sensor 30 when the insert 20 is inserted and fastened in the pipe wall 12. The thickness of the insert 20 between the inner surface 23 and an outer surface 22 can be sufficient to accommodate the threaded portion 26 and to provide structural strength (e.g. to reduce stress, bending, or breaking, etc.) at the thinnest portion. Resultantly, the insert 20 can be only slightly larger at it largest diameter or widest point than the sensor 30, using less material and leaving more room around the pipe 10 to locate other sensors 30, if desirable. In this way, sensors 30 can be positioned at multiple points circumferentially around the pipe 10, or in multiple points along the longitude of the pipe 10, to map pipe, fluid, and/or flow characteristics three dimensionally.

Figure 2:
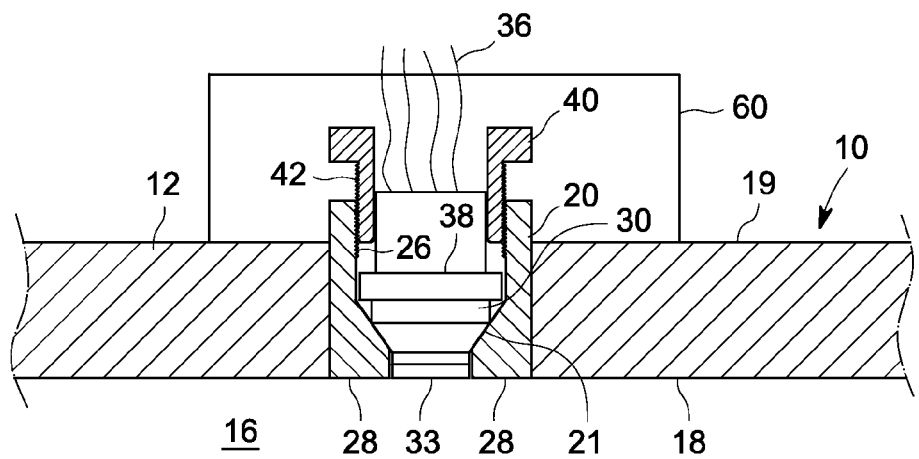
FIG. 2 is a side view of a sectioned pipe wall of a pipe, with a sensor embedded in the pipe wall, in one exemplary embodiment of the invention corresponding to FIG. 1.

FIG. 2 is a side view of a sectioned pipe wall 12 of a pipe 10, with a sensor 30 embedded in the pipe wall 12, in one exemplary embodiment of the invention corresponding to FIG. 1.

The insert 20 can be inserted into the passage 14 of the pipe wall 12 so that the radially inwardly facing surface 28 is approximately flush with the inner surface 18 of the pipe wall 12, extended beyond the inner surface 18 of the pipe wall 12, or recessed into the pipe wall 12. Positioning the radially inwardly facing surface 28 of the insert 20 approximately flush with the inner surface 18 of the pipe wall 12, as illustrated, can reduce any effect the insert 20 has on the flowing fluid in the pipe 10. Positioning the radially inwardly facing surface 28 of the insert 20 so that the insert 20 extends into the pipe 10 beyond the inner surface 18 of the pipe wall 12 or so that the insert 20 is recessed in the pipe wall 12 can accommodate physical constraints engaging the pipe 10, the insert 20, the sensor 30, and the locking nut 40, or can accommodate any limitations of the sensor 30. Once positioned, the insert 20 can be secured in the pipe wall 12 by welding or other known methods suitable for the structural requirements and the materials of the pipe 10 and the insert 20. Welding can include but is not limited to gas tungsten arc welding and electric arc welding. The securement can yield a fluid seal between the insert 20 and the pipe wall 10 that is capable of withstanding high pressures up to and exceeding 10,000 psi (68,947,573 Pa), 15,000 psi (103,421,359 Pa), or 20,000 psi (137,895,146 Pa).

The sensor 30 can be inserted into the insert 20, so that the sensor tip 33 is exposed to the inside of the pipe 10 and any fluid in the pipe 10. As with the insert 20, the sensor tip 33 can be approximately flush with the inside surface of the pipe wall 12, recessed into the pipe wall 12, or extended beyond the inside surface of the pipe wall 12, depending on the design preferences and the operating conditions desirable for the sensor 30. Positioning the insert 20 and the sensor 30 flush with the inside diameter of the pipe wall 12 can reduce impact on the flow conditions of the fluid in the pipe 10.

To obtain the proper position of the sensor 30, the locking nut 40 with externally threaded portion 42 that engages the internally threaded portion 26 of the insert 20 is tightened radially inward to depress upon the collar 38 of the sensor 30 and force the sensor 30 radially inward. The tapered surface 39 of the sensor 30 impacts and is pressed against the tapered portion 21 of the insert 20, making a seal, and positioning the sensor 30. The seal can withstand high pressures, including pressures in excess of 10,000 psi (68,947,573 Pa), 15,000 psi (103,421,359 Pa), or 20,000 psi (137,895,146 Pa), and beyond. The locking nut 40 can also be unscrewed and disengaged, allowing the sensor 30 to be easily removed and/or replaced with another sensor 30, for instance, if the sensor 30 fails.

The insert 20 can be made of a suitable material, such as a type of steel, a superalloy, or another high-performance alloy, such as an austenitic nickel-chromium-based superalloy. The insert 20 can be harder than the sensor 30 so that when the tapered surface 39 of the sensor 30 impacts and seals against the tapered portion 21 of the insert 20, the insert 20 is less likely to be compromised, bent or otherwise damaged. The insert 20 can then be reusable in removing and/or replacing the sensor 30. Alternatively, the insert 20 can be softer than the sensor 30, so that the sensor 30 is less likely to be compromised, bent, or otherwise damaged.

A housing 60 can be placed over the sensor 30, the locking nut 40, and the insert 20. The housing 60 can be secured to the pipe 10 so that the housing 60 protects the sensor 30 and any electronic components. The housing 60 can seal out water, other fluids, contaminants, or destructive agents.

Figure 3:
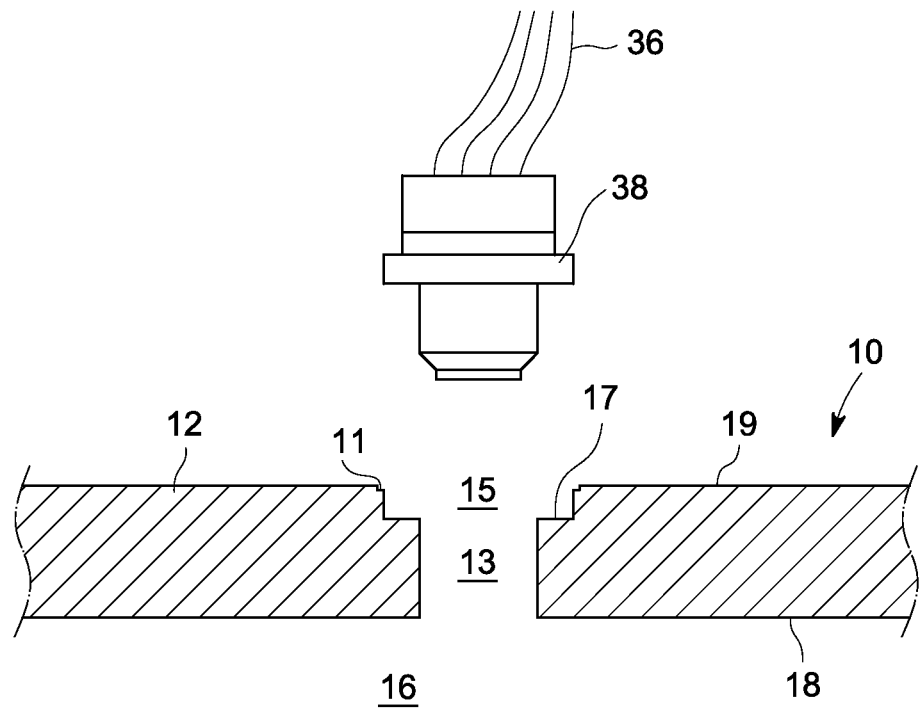
FIG. 3 is an exploded side view of a sectioned pipe wall of a pipe, with a sensor that can be embedded in the pipe wall, in another exemplary embodiment of the invention.

FIG. 3 is an exploded side view of a sectioned pipe wall 12 of a pipe 10, with a sensor 30 that can be embedded in the pipe wall 10, in another exemplary embodiment of the invention. The passage 14 of the pipe wall 12 can have a first passage portion 13 and a second passage portion 15. The first passage portion 13 can have a smaller diameter or a smaller width than the diameter or width of the second passage portion 15. The first passage portion 13 can be sized and shaped so the sensor 30, on the radially inward side of the collar 38, can fit in the first passage portion 13. For instance, if the sensor 30, on the radially inward side of the collar 38 is cylindrical, then the first passage portion can also be cylindrical, sized slightly larger than the sensor 30 on the radially inward side of the collar 38.

The second passage portion 15 can be sized and shaped so the collar 38 can fit in the second passage portion 15 and abut or rest against a shoulder 17 that connects between the first passage portion 13 and the second passage portion 15. The collar 38, for instance, can be approximately 0.75 inches (19.05 mm) or 0.875 inches (22.225 mm) in diameter. Therefore, the outer diameter of the shoulder 17 can also be approximately between 0.75 inches (19.05 mm) or 0.875 inches (22.225 mm) in diameter, or be slightly larger by an amount sufficient to allow the collar to fit in the second passage portion 15 and permit fastening of the sensor 30 in place. For instance, if the sensor is fastened to the pipe 10 by welding, then the clearance between the collar 38 and the surfaces defining the second passage portion 15 should be limited to an amount acceptable for welding. A spot face 11 can also be added with a larger diameter than the second passage portion 15 to enable room to operate and fasten the sensor 30. For instance, if the collar 38 has a diameter of approximately 0.75 inches (19.05 mm), then the spot face 11 can have a diameter of approximately 1.0 inches (25.4 mm), which would create a ring-shaped surface of the spot face 11 0.125 inches (3.175 mm) wide.

Figure 4:
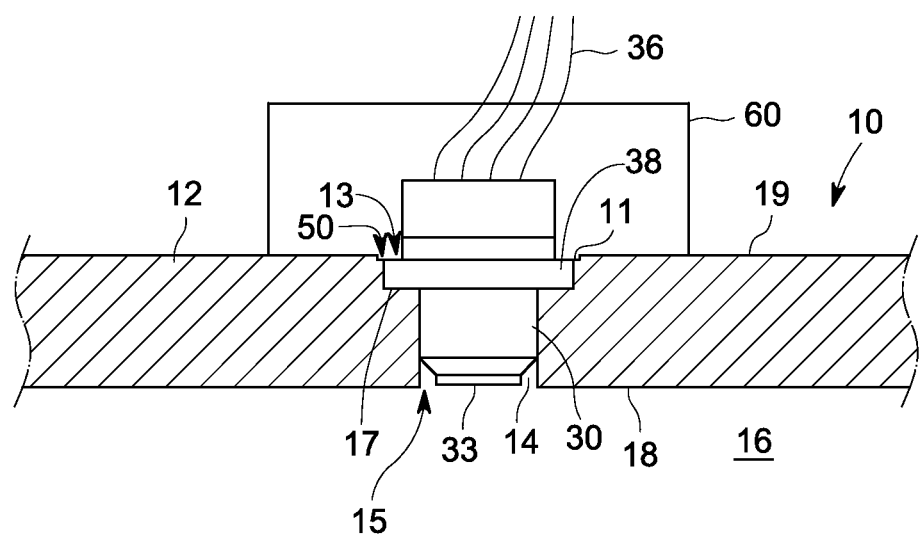
FIG. 4 is a partially sectioned side view of a pipe wall with a sensor embedded in the pipe wall, in one embodiment corresponding to FIG. 3.

FIG. 4 is a partially sectioned side view of a pipe wall 12 with a sensor 30 embedded in the pipe wall 12, in one embodiment corresponding to FIG. 3. The collar 38 can be positioned on the sensor 30, and the spot face 17 can be positioned between the outer surface 19 and the inner surface 18 of the pipe wall 12 so that the sensor tip 33 can be positioned as desirable, either flush with the inner surface 18 of the pipe wall 12, extended into the pipe 10 beyond the pipe wall 12 (e.g. toward the center axis of the pipe 10), or recessed into the pipe wall 12 (e.g. radially outward from the center axis of the pipe 10). Positioning the sensor tip 33 approximately flush with the inner surface 18 of the pipe wall 12 can reduce or prevent any impact the sensor 30 can otherwise have on the flow conditions of the fluid in the pipe 10.

The collar 38 can also be approximately flush with the outer surface 19 of the pipe wall 12, recessed into the pipe wall 12 (e.g. toward the center axis of the pipe 10), or extended out of the pipe wall 12 (radially outward from the center axis of the pipe 10). Once the sensor 30 is positioned, with the collar 38 abutting, resting, or being pressed against the shoulder 17, the collar can be fastened in place by such as but not limited to welding at the joint 50 between the collar 38 and the pipe wall 10. Welding can include but is not limited to electron beam welding and laser welding. The joint 50 can make a seal that can withstand high pressures, including pressures in excess of 10,000 psi (68,947,573 Pa), 15,000 psi (103,421,359 Pa), or 20,000 psi (137,895,146 Pa), and beyond. Positioning the collar 38 so the collar 38 is approximately flush or slightly recessed might allow easier welding.

The total pipe area required to install a sensor in this fashion can be only slightly larger than the sensor 30 (e.g. 0.5 inches (12.7 mm) larger). Resultantly, less material is used and more room around the pipe 10 is available to install other sensors 30, if desirable. Sensors 30 can be positioned at multiple points circumferentially around the pipe 10, or in multiple points along the longitude of the pipe 10, to map pipe, fluid, and/or flow characteristics three dimensionally.

A housing 60 can be placed over the sensor 30 and attached to the pipe 10 to protect the sensor 30 and any electronic components. The housing 60 can be fastened to the pipe 10 and the housing 60 can seal out water, other fluids, contaminants, or destructive agents.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for mounting a pipe sensor, the apparatus comprising:
   a pipe with a pipe wall defining an interior, the pipe wall having an outer surface, an inner surface, and a section removed defining a passage from the outer surface through the inner surface to the interior;
   an insert disposed in the passage, the insert having an outer surface and an inner surface, the inner surface defining a cavity, the insert fastened and sealed to the pipe wall at the outer surface of the insert, the inner surface of the insert having a tapered portion;
   a sensor having a collar attached thereto, the sensor and the collar disposed in the cavity of the insert, the sensor fastened and sealed to the insert, the sensor exposed to the interior of the pipe; and
   a locking nut at least partially disposed in the cavity of the insert and engaged with the insert to press upon the collar to fasten and seal the sensor to the insert.

2. The apparatus of claim 1, wherein the insert has a first threaded portion on the inner surface, the locking nut has a second threaded portion on an outer surface of the locking nut, and the second threaded portion threads into the first threaded portion to fasten and seal the sensor to the insert.

3. The apparatus of claim 1, wherein the sensor is positioned flush with the inner surface of the pipe wall.

4. The apparatus of claim 1, wherein the locking nut presses the sensor against the tapered portion of the insert to form a seal between the sensor and the tapered portion capable of withstanding fluid pressure.

5. An apparatus for mounting a pipe sensor, the apparatus comprising:
   a pipe with a solid pipe wall defining an interior, the solid pipe wall having an outer surface, an inner surface, and a section removed defining a passage from the outer surface through the inner surface to the interior, the passage comprising a first diameter portion formed in the solid pipe wall proximate the outer surface and a second diameter portion formed in the solid pipe wall proximate the inner surface, the second diameter portion smaller than the first diameter portion; and
   a sensor having a collar attached thereto, the collar having a third diameter larger than the second diameter portion and smaller than the first diameter portion, the sensor and the collar disposed in the passage, the collar welded to the solid pipe wall proximate the outer surface to form a fluid-impermeable seal between the collar and the solid pipe wall, the sensor exposed to the interior of the pipe.

6. The apparatus of claim 5, wherein the sensor is positioned flush with the inner surface of the solid pipe wall.

7. The apparatus of claim 5, further comprising a shoulder connecting, between the first diameter portion and the second diameter portion, and wherein the collar is pressed against the shoulder.

8. An apparatus for mounting a sensor in a passage through a pipe wall, the apparatus comprising:
   an insert configured to be fastened and sealed to the pipe wall in the passage, the insert having an outer surface and an inner surface, the inner surface defining a cavity and having a first tapered portion;
   a sensor comprising a collar attached thereto, the sensor and its collar disposed within the cavity of the insert, the sensor fastened and sealed to the insert, the sensor configured to be exposed to an interior of the pipe; and
   a locking nut at least partially disposed within the cavity of the insert and engaged with the insert to press upon the collar to fasten and seal the sensor to the insert.

9. The apparatus of claim 8, wherein the insert is welded to the pipe wall to fasten the insert thereto and to form a fluid-impermeable seal between the insert and the pipe wall.

10. The apparatus of claim 9, wherein the weld between the insert and the pipe wall is capable of withstanding pressure up to and exceeding about 10,000 psi.

11. The apparatus of claim 9, wherein the weld between the insert and the pipe wall is capable of withstanding pressure up to and exceeding about 20,000 psi.

12. The apparatus of claim 8, wherein the sensor is configured to be positioned flush with an inner surface of the pipe wall.

13. The apparatus of claim 8, wherein the sensor comprises a second tapered portion corresponding to the first tapered portion of the insert, and wherein the locking nut engaged with the insert presses upon the collar to fasten and seal the second tapered portion of the sensor to the first tapered portion of the insert.

14. The apparatus of claim 13, wherein the insert has a first threaded portion, the locking nut has a second threaded portion, and the second threaded portion threads into the first threaded portion.

15. The apparatus of claim 13, wherein the sensor is positioned flush with an inner surface of the pipe wall.

16. The apparatus of claim 13, wherein the locking nut presses the sensor against the tapered portion of the insert to form a seal between the sensor and the tapered portion capable of withstanding fluid pressure.

17. The apparatus of claim 8, wherein the insert has a first threaded portion on the inner surface of the insert, the locking nut has a second threaded portion on an outer surface of the locking nut, and the second threaded portion threads into the first threaded portion to fasten and seal the sensor against the insert.

\* \* \* \* \*

UNITED STATES PATENT AND TRADEMARK OFFICE
CERTIFICATE OF CORRECTION

PATENT NO. : 8,733,188 B2
APPLICATION NO. : 12/870028
DATED : May 27, 2014
INVENTOR(S) : Furlong et al.

Page 1 of 1

It is certified that error appears in the above-identified patent and that said Letters Patent is hereby corrected as shown below:

In the Claims

In Column 6, Line 34, in Claim 5, delete "pipe wail" and insert -- pipe wall --, therefor.

In Column 6, Line 49, in Claim 6, delete "connecting," and insert -- connecting --, therefor.

In Column 7, Line 2, in Claim 10, delete "pipe wail" and insert -- pipe wall --, therefor.

Signed and Sealed this
Fourteenth Day of April, 2015

Michelle K. Lee
*Director of the United States Patent and Trademark Office*